US005597445A

United States Patent [19]
Westerberg

[11] Patent Number: 5,597,445
[45] Date of Patent: Jan. 28, 1997

[54] METHOD FOR RECOVERING SODIUM FROM A SPENT COOKING LIQUOR

[75] Inventor: J. Lennart Westerberg, Mobile, Ala.

[73] Assignee: International Paper Company, Purchase, N.Y.

[21] Appl. No.: 158,962

[22] Filed: Nov. 29, 1993

[51] Int. Cl.$^6$ .......................... D21C 11/06; D21C 11/10; D21C 11/12

[52] U.S. Cl. .................. 162/29; 162/30.11; 423/DIG. 3

[58] Field of Search .............................. 162/15, 16, 30.1, 162/30.11, 29; 423/DIG. 3

[56] References Cited

U.S. PATENT DOCUMENTS

| | | | |
|---|---|---|---|
| 3,153,609 | 10/1964 | Markant et al. | 162/36 |
| 3,554,858 | 1/1971 | Timpe | 162/30.1 |
| 3,617,434 | 11/1971 | Nakafuri et al. | 162/30 |
| 3,650,889 | 3/1972 | Fogman et al. | 162/30.1 |
| 4,431,617 | 2/1984 | Farin | 162/36 |
| 5,284,550 | 2/1994 | Tanca et al. | 162/30.1 |

FOREIGN PATENT DOCUMENTS 57-019079  1/1982  Japan.

*Primary Examiner*—Steven Alvo
*Attorney, Agent, or Firm*—Luedeka, Neely & Graham, P.C.

[57] ABSTRACT

A method for recovering sodium from a spent cooking liquor used in a kraft pulping process employing sodium hydroxide as a cooking agent resulting in the presence of sodium and sulfur combined with various elements in the spent cooking liquor. Black liquor is converted to green liquor, and the green liquor is reacted with lime in a causticizer to produce caustic and calcium carbonate. The caustic is recovered for use as a cooking liquor and the calcium carbonate is heated in a lime kiln to provide a source of lime. Flue gases containing free lime evolved from the lime kiln are contacted with a sodium carbonate solution in a scrubber to convert lime to caustic.

8 Claims, 2 Drawing Sheets

METHOD FOR RECOVERING SODIUM FROM A SPENT COOKING LIQUOR

The present invention relates generally to the recovery of sodium constituents from spent cooking liquor in a kraft pulp digesting process. More particularly, the invention relates to a method in which sodium in the form of sodium carbonate from the spent liquor is recovered as sodium hydroxide by the lime process generating calcium carbonate which is in turn recycled for production of lime, wherein improved recovery of sodium and calcium is achieved.

In a typical papermaking process, pulp is prepared from wood by either chemical or mechanical pulping processes. In the more common chemical process, wood chips are loaded into a pressure vessel known as a digester which is charged with a chemical reagent. Heat is supplied to the digester to "cook" the wood chips to remove undesirable substances from the wood (i.e., lignin) and to liberate the desirable cellulosic fiber.

A widely used chemical pulping process today is the so-called kraft (sulphate) pulping process which uses an alkaline chemical reagent referred to as "white liquor" to act upon the lignin in the material. Typically, the white liquor is an alkaline solution of sodium hydroxide (NaOH) and sodium sulfide ($Na_2S$), provided by an aqueous solution typically containing between about 80–90 grams/liter of NaOH and between about 20–25 grams/liter of $Na_2S$ with minor amounts of sodium carbonate, sulfate and thiosulfate. Depending on the wood species used and the desired end-product to be manufactured, white liquor is added to the wood chips in sufficient quantity to provide a total charge of alkali of between about 15–20% $Na_2O$ based on the oven-dried weight of the wood. Typically, the temperature of the wood/liquor mixture is maintained at about 165°–170° C. for a total reaction time of about 2–3 hours. When digestion is complete, the pressure in the digester is released and the resulting wood pulp is separated from the spent liquor, called "black liquor", in a series of washing operations. The black liquor (which contains organic constituents and sodium) is thereafter concentrated and the concentrated black liquor burned (referred to as "smelting") to reduce the organic constituents to $CO_2$ and $H_2O$. The ash from the smelting operation containing sodium carbonate ("soda ash") is mixed with water to form a weak solution referred to as "green liquor". The green liquor is processed to recover the sodium content by contacting the solution with slaked lime ($CaOH_2$) to provide caustic (NaOH), which is used to regenerate white liquor, producing calcium carbonate in the process. The calcium carbonate in turn is processed by heating in a lime kiln to provide free lime (CaO), which is thereafter converted to slaked lime to provide a source of lime.

The regeneration of green liquor into caustic by reaction with slaked lime ($Na_2CO_3 + Ca(OH)_2 \rightarrow 2NaOH + CaCO_3$) is economically important in the making of paper, because of the large quantities of caustic needed and the extreme cost that would be incurred if caustic was not generated from sodium recovered from the digesting process. However, many pulp mills are limited in their ability to regenerate additional caustic by the size of the lime kiln.

This inability to provide additional lime is detrimental to efforts to improve the economics of the soda recovery process. In addition, current soda regeneration processes are disadvantageous in that they continuously recirculate lime within the plant, which creates scaling and plugging problems in the equipment with attendant losses of material, process time and efficiency.

Accordingly it is an object of the present invention to provide an improved method for recovering sodium from spent alkaline cooking liquor in a kraft pulp mill.

Another object of the invention is to provide an improved method for recovering sodium from a spent cooking liquor used in a kraft pulping process employing sodium hydroxide as a cooking agent resulting in the presence of sodium and sulfur combined with various elements in the spent cooking liquor.

Still another object of the present invention is to provide an improved sodium recovery method for a kraft pulping process which enables more caustic (NaOH) to be regenerated from the spent cooking liquor for a given lime supply as compared to conventional processes.

An additional object of the present invention is to provide a method of the character described wherein lime present in the gaseous effluent from the lime kiln is contacted with sodium carbonate to provide caustic.

Yet another object of the present invention to provide a method of the character described wherein excess free lime which passes through the slaker without conversion thereof is utilized to provide sodium hydroxide.

A further object of the present invention is to provide a method of the character described which reduces the recirculation of free lime within a soda recovery process and reduces maintenance resulting from the presence of free lime.

Another object of the present invention is to provide a method of the character described which reduces the total reduced sulphur in the lime kiln scrubber stack.

Still another object of the present invention is to provide a process of the character described which is uncomplicated in use and economical in operation.

Having regard to the foregoing and other objects and advantages, the present invention is directed to a method for recovering sodium from a spent cooking liquor used in a kraft pulping process employing sodium hydroxide as a cooking agent resulting in the presence of sodium and sulfur combined with various elements in the spent cooking liquor. In general, the method comprises concentrating the spent cooking liquor and combusting the concentrated liquor to produce a smelt containing $Na_2Co_3$, and combining the smelt with water to provide a green liquor. The green liquor is reacted with $Ca(OH)_2$ to produce a solution of NaOH containing $CaCO_3$ as a precipitate which is separated from the NaOH solution to provide a source of recovered NaOH for use in providing fresh cooking liquor.

The separated $CaCO_3$ is heated in a kiln to convert the material to CaO, wherein CaO emerges from the kiln as a dry product and hot gases containing CaO particles entrained therein are evolved from the kiln. The CaO dry product from the kiln is mixed with water to regenerate $Ca(OH)_2$ for the NaOH reaction.

The hot gases evolved from the kiln containing CaO particles are contacted with an aqueous solution containing $Na_2CO_3$ to produce a solution of NaOH containing $CaCO_3$ as a precipitate. The $CaCO_3$ precipitate is separated from the NaOH solution to provide a further source of recovered NaOH for use in providing fresh cooking liquor, and the $CaCO_3$ precipitate is recycled to the kiln.

One important aspect of the present invention relates to the use of free lime in the lime kiln scrubber to form caustic in the scrubber water, which is believed to occur according to the reaction $Na_2CO_3 + (CaO + H_2O \rightarrow Ca(OH)_2) \rightarrow NaOH + CaCO_3$. This is advantageous to not only provide an additional amount of caustic, but also to minimize the recirculation of free lime in the plant, particularly in the scrubber and downstream equipment, and to reduce the total reduced sulphur in the scrubber exhaust gases.

Another important aspect of the invention relates to the reaction of sodium carbonate supplied in the feed to the lime kiln scrubber with lime in the kiln dust. In conventional processes the lime in the dust is conducted from the scrubber to the system where calcium carbonate is separated from the caustic solution (the "mud system", with "mud" referring generally to calcium carbonate solids), so that it eventually ends up either in the mud filter or is returned to the lime kiln. This is undesirable, since recirculation of lime in the mud system tends to clog the mud filter prematurely and also burdens the efficiency of the recovery process.

Furthermore, the slaking process for producing slaked lime from the causticizer typically operates with an excess of free lime in order to achieve the necessary conversion. This excess lime is carried with the $CaCo_3$ solids from the causticizing step into the mud separation equipment, representing additional troublesome clogging and processing problems. In accordance with a further aspect of the invention, $Na_2CO_3$ is supplied to the scrubber in excess of what is required for reaction with the CaO in the lime kiln dust. This excess $Na_2CO_3$ is carried with the scrubber water into the mud system where it reacts with the excess lime carried with the $CaCO_3$ from the causticizer. This further reduces problems associated with lime in the system.

DETAILED DESCRIPTION OF THE INVENTION

Figure 1:
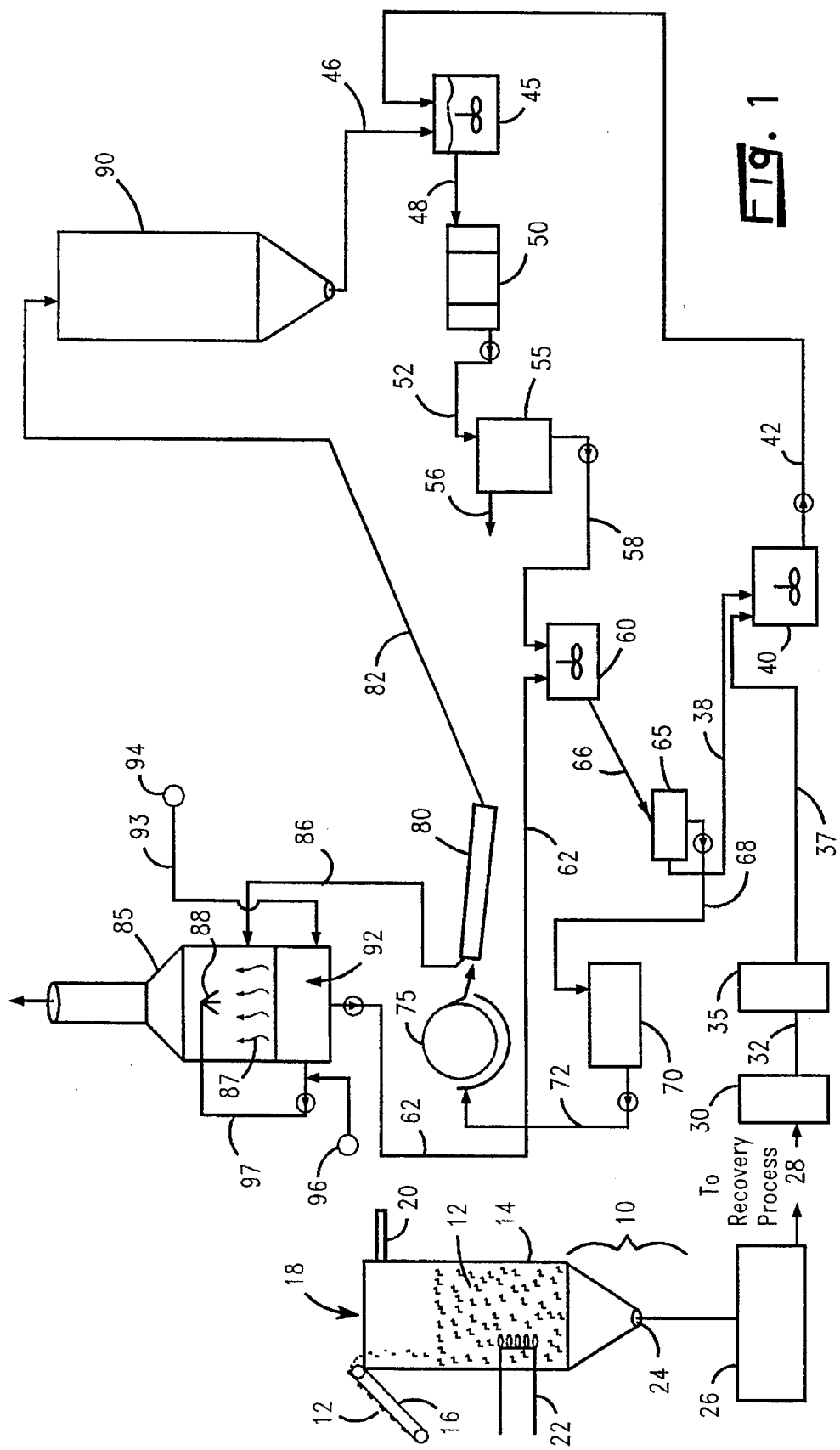
FIG. 1 is a diagrammatic view illustrating the various steps in a process of sodium recovery in a kraft process according to one embodiment of the invention.

With reference now to the drawings in further detail wherein the reference characters designate like or similar parts throughout the several views, the more general features of the invention are illustrated in the diagrammatic view of FIG. 1 wherein there is shown a portion of a kraft pulping process in which wood chips 12 are loaded into a heated, pressurized cooking vessel, such as digester 14, for cooking of the wood chips 12 to produce pulp. The wood chips 12 may be loaded into the digester 14, as by a conveyor 16 which feeds the wood chips 12 into the digester 14 through an opening 18 provided adjacent the top of the digester 14.

The loaded digester may be sealed to retain pressure by securing a cap (not shown) over the opening 18, and the digester 14 charged with an alkaline cooking liquor or "white liquor" introduced into the digester 14 from an external source, as by inlet conduit 20. The white liquor may be provided by an aqueous solution containing between about 80–90 grams/liter of NaOH and between about 20–25 grams/liter of $Na_2S$, with minor amounts of sodium carbonate, sulfate and thiosulfate. White liquor is preferably added to the wood chips 12 in sufficient quantity to provide an equivalent total charge of alkali of about 15–20% $Na_2O$ based on the oven-dried weight of the wood chips.

Heat is supplied, as by steam pipes 22, to the loaded and charged digester to raise the temperature and pressure in the digester 14 to provide conditions within the digester 14 sufficient to digest the wood chips and thereby remove undesirable substances from the wood (i.e., lignin) and liberate desirable cellulosic fiber. Typically, the temperature of the wood/liquor mixture in the digester 14 is maintained at about 165°–170° C. (at a pressure of between about 100 and 120 psig) for about 2–3 hours for sufficient digestion of the wood chips 12. When digestion is complete, the pressure in the digester 14 is released by opening a blow valve 24 connected to the digester, and the digested pulp and the spent cooking liquor or "black liquor" are evacuated from the digester through the blow valve.

The digested pulp is separated from the black liquor in a series of washing operations indicated at 26. The pulp may be used to make paper in any of the conventional papermaking processes, and the black liquor is conducted to a recovery process as at 28 to recover the sodium content by converting sodium constituents of the black liquor to caustic (NaOH), which may be used to provide fresh cooking liquor.

In the recovery process black liquor containing organic constituents and sodium and sulfur combined with various elements, e.g., sodium carbonate, sulfate and thiosulfate is processed to provide a solution called "green liquor", principally containing sodium carbonate ($Na_2CO_3$, a.k.a. "soda ash"), which is subsequently converted to caustic (NaOH) which may be used to generate fresh white liquor. In FIG. 1, there is shown a diagrammatic representation of various steps in the preparation of green liquor and its conversion to white liquor according to a preferred embodiment of the invention. The basic equipment for carrying out the process is conventional and its operation is well-known to those of ordinary skill. Basically, the operations are carried out using a concentrator 30, a smelter 35, a dissolving tank 40, a slaker 45, a causticizer 50, a clarifier 55, a mud mix tank 60, a mud washer 65, a lime storage tank 70, a mud filter 75, a lime kiln 80, a lime kiln scrubber 85, and a lime bin 90. Additional or different equipment may be used, depending on the application, for performing the steps of the process. Piping and control details are omitted herein for the sake of clarity as those of ordinary skill are believed to be sufficiently familiar with such details to be able to successfully practice the invention.

Conversion of black liquor to green liquor is preferably accomplished by concentrating the black liquor in the concentrator 30 and passing the concentrate as at 32 to the smelter or furnace 35 where the black liquor concentrate is burned (referred to as "smelting") to essentially reduce the organic constituents to $CO_2$ and $H_2O$, and to reduce the sodium constituents to an "ash". The resulting sodium-containing ash from the smelting operation is conducted as at 37 to dissolving tank 40 where it is mixed with water to provide green liquor.

The green liquor may contain from about 70 to about 80 g/l $Na_2CO_3$, from about 30 to about 40 g/l NaS, and from about 5 to about 10 g/l NaOH as its primary components.

The water mixed with the ash in the dissolving tank 40 is preferably provided by a weak wash solution which is conducted as at 38 from the mud washer 65 to the dissolving tank 40, for mixing with the ash from the smelt to provide green liquor. As will be explained below, lime "mud" (an aqueous slurry of various calcium solids, i.e., $CaCo_3$, and $Ca(OH)_2$ and/or CaO, which result from processing of $CaCO_3$ in the process) is washed in the mud washer 65 to separate solids in the slurry from liquids. This provides a substantially solids-free aqueous solution, containing water and NaOH. As mentioned above and as will be explained further below, at least a portion of the NaOH in the solution from the mud washer 65 is provided by NaOH generated in the scrubber 85, and by NaOH which is generated in the mud mix tank 60.

The green liquor in the dissolving tank 40 is processed to recover the sodium present therein by converting sodium constituents (principally $Na_2CO_3$) in the liquor to caustic (NaOH). This is preferably accomplished by reacting $Na_2CO_3$ in the green liquor with slaked lime, $Ca(OH)_2$. To accomplish this, the green liquor is preferably conducted as at 42 to the slaker 45 where free lime (CaO) from lime bin 90 is conducted as at 46 into the slaker 45 for contacting the aqueous solution to convert free lime to slaked lime. In this reaction, free lime is added at a stoichiometric excess of about 5% to about 7% in order to achieve the necessary conversion.

The effluent from the slaker 45 is passed as at 48 to the causticizer unit 50 as a mixture principally containing slaked lime and green liquor along with the excess lime. In the causticizer 50, the reaction of sodium carbonate in the green liquor with the slaked lime is completed to produce the solution of NaOH containing $CaCO_3$ as a precipitate along with lime solids.

The mixture of NaOH, $CaCO_3$ and lime solids is conducted from the causticizer 50 as at 52 to the clarifier 55 for separation of $CaCO_3$ precipitate and other solids from the NaOH solution. The NaOH solution is recovered from the clarifier 55, as at drain 56, to provide a source of recovered NaOH for use in providing fresh cooking liquor. The solids are conducted from clarifier 55 as an essential aqueous slurry of water, residual NaOH, $CaCO_3$ and $Ca(OH)_2$ or CaO solids in conduit 58 to the mud mix tank 60 where the slurry is mixed with a wash solution directed from the scrubber 85 via conduit 62. In the mix tank 60, the slurry is diluted and sodium carbonate present in the scrubber water is reacted with the excess lime carried over from causticizer 50 to provide caustic.

The diluted slurry is thereafter conducted from the mix tank 60 to the mud washer 65 as in conduit 66 to separate $CaCO_3$ and other solids from the slurry, and the liquid effluent from the mud washer 65 is conducted in conduit 38 to the dissolving tank 40 for mixing with the smelt, as explained above. The $CaCO_3$ solids are conducted from the mud washer 65 as in conduit 68 to the lime mud storage tank 70, and thereafter processed through the lime mud filter 75 as at 72 as an initial drying step and thence to the lime kiln 80. In the kiln 80, the solids are processed in a conventional manner at a temperature of about 1800° F., converting $CaCO_3$ to a substantially dry CaO product.

Figure 2:
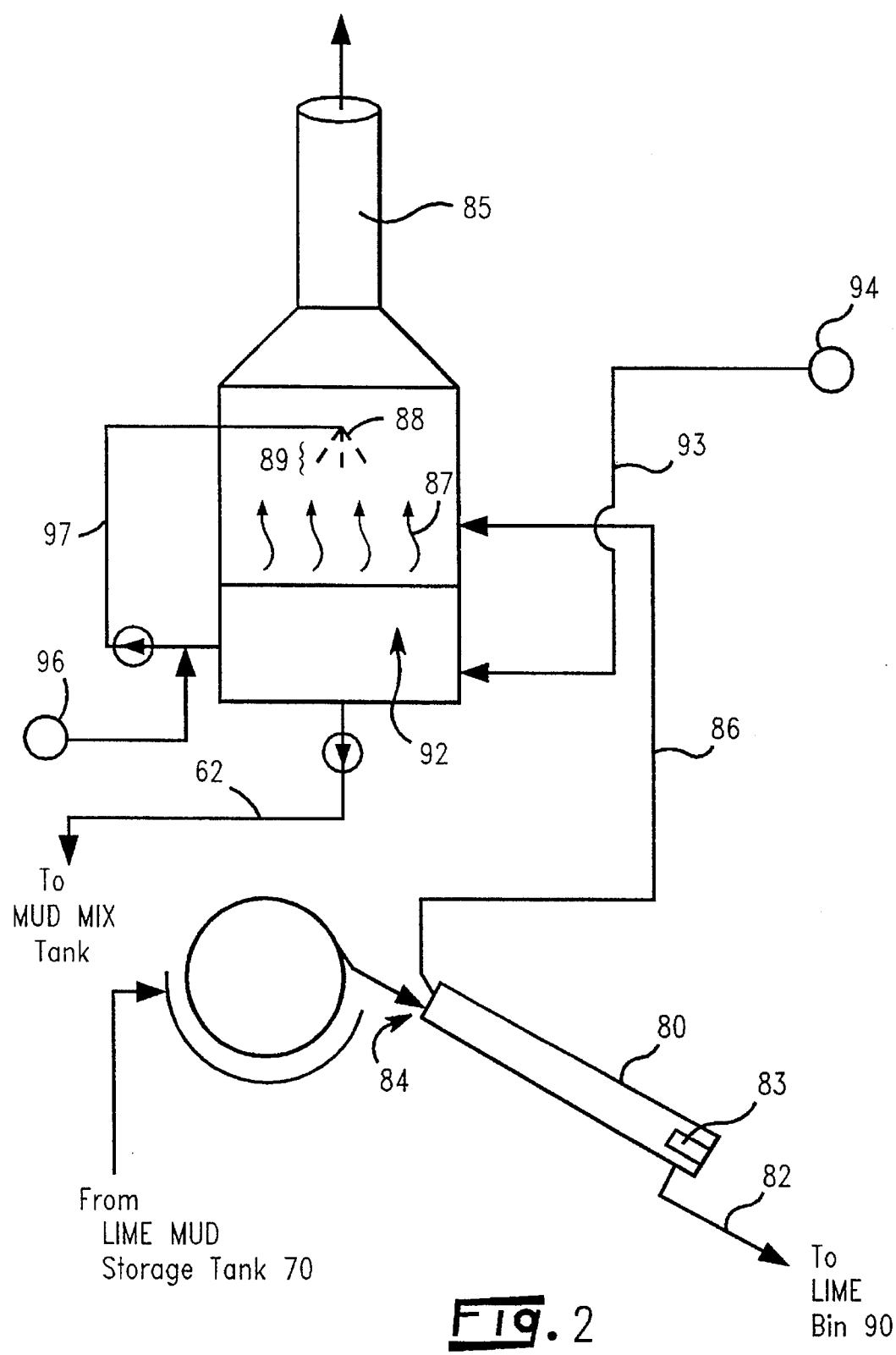
FIG. 2 is a diagrammatic view showing steps in a process according to the present invention wherein flue gases evolved from a rotary lime kiln are introduced into a scrubber to enable CaO dust entrained in the flue gases to be reacted with sodium carbonate to produce NaOH and $CaCO_3$.

With additional reference to FIG. 2, the kiln 80 is preferably a countercurrent rotary kiln having a burner 83 located opposite a feed end 84 of the kiln 80. CaO is discharged from the feed end of the kiln 80 to conduit 82 as a dry product and hot gases containing CaO particles entrained therein are evolved at the opposite end of the kiln as at 86. The CaO dry product is conveyed in conduit 82 to the lime bin 90, which provides surge capacity, and is metered from the bin 90 in desired amounts to the slaker 45, where, as described previously, CaO is reacted with water to produce $Ca(OH)_2$ to provide $Ca(OH)_2$ for the causticizers 50 to produce NaOH solution containing $CaCO_3$ as a precipitate.

The hot gases evolved from the kiln typically have dust and other particulates entrained therein, of which the majority (i.e. up to about 95%) is $CaCO_3$ dust and the remainder is CaO dust. Typically, the amount of dust carried out with the gaseous effluent is from about 15% to about 25% by weight of the feed into the kiln. For example, if the dust in the gas represents about 25% of the feed into the kiln and the feed of solids (dry wt.) into the kiln 80 is 1000 lb/hr, approximately 750 lb/hr of CaO dry product exits the kiln and approximately 250 lb/hr of dust is carried out entrained in the gas exiting the kiln, approximately 95% (237.5 lb/hr) of which is $CaCO_3$ dust and the remaining 5% (12.5 lb/hr) is CaO dust.

The kiln flue gases are introduced into the scrubber 85 as at 86 at the lower end of the scrubber so that the gases rise upwardly within the scrubber as at 87 toward a nozzle assembly 88 which introduces a spray 89 of scrubbing fluid into the scrubber 85 for counter-currently contacting the flue gases as they rise through the scrubber. The dust particles in the flue gases are stripped from the gas by the spray 89 and the liquid and dust particles collect in a pool 92 at the bottom of the scrubber 85. An aqueous make-up solution containing $Na_2CO_3$ is introduced into the bottom end of the scrubber 85 for reacting with CaO in the collected pool, producing a solution of NaOH containing $CaCO_3$ as a precipitate.

The $Na_2CO_3$ make-up solution, preferably from about 5 to about 35% $Na_2CO_3$, and most preferably about 10% $Na_2CO_3$, is preferably added to the bottom of the scrubber through a heat traced and insulated conduit 93 in flow communication with an external source 94 at a rate equivalent to from about 20 lbs. to about 40 lbs. of $Na_2O$/ADT (ADT=air dried tons of pulp). This amount of sodium carbonate is preferably in excess of that which is required to react with the free lime from the flue gases so that unreacted sodium carbonate is present in the pool 92 which is drained from the scrubber 85. The spray 89 is preferably provided by a mixture of water, as from source 96, and liquid recirculated from the pool 92 in conduit 97, as best seen in FIG. 2. Accordingly, in a preferred embodiment, the spray 89 is a mixture of water, sodium hydroxide and sodium carbonate with some calcium carbonate/calcium oxide solids suspended therein. To minimize the presence of solids in the spray, so as to avoid clogging of the nozzle assembly 88, the liquid from the pool is preferably withdrawn from a location near the upper surface of the pool 92.

A principle advantage of the present invention relates to the conversion of free lime in the scrubber to calcium carbonate to provide caustic. This is advantageous to not only provide additional caustic, but also to avoid the recirculation of lime in the plant and the attendant buildup of scale and deposits in the scrubber due to the presence of lime. In addition, it has been observed that lime from the scrubber water contributes to premature clogging of the cloth of the mud filter, and that build-up of free lime in the mud presented to the kiln is detrimental to efficiency of the kiln. This likewise requires maintenance with associated expense. Particularly, a significant increase in the life of the mud filter cloth and a commensurate reduction in downtime for maintenance may be achieved. It has also been observed that conversion of excess lime carried into the mud mix tank 60 to produce $CaCO_3$ results in the larger particles; i.e., has an agglomerating effect, and that these larger particles which collect on the mud filter provide an improved filtration medium. A 4–5% increase has been experienced in the dry solid coming off the mud filter as compared to prior processes, wherein the excess lime was recirculated through the mud system.

Additionally, it has been observed that a reduction in the free lime in the scrubber provides a reduction in the total reduced sulphur (TRS).

Water vapor and scrubbed flue gases may be exhausted out of the scrubber 85 to the atmosphere through exhaust stack 100, or to additional cleaning stages if desired or otherwise required to comply with relevant environmental guidelines.

The NaOH solution drained from the scrubber may have a solids concentration in the range of from about 2% to about 10%, with the concentration of the NaOH and dissolved $Na_2CO_3$ varying depending on the amount of water and $Na_2CO_3$ added to the scrubber. The solid phase of the solution drained from the scrubber is essentially 100% $CaCO_3$. This solution is conducted in conduit 62 from the scrubber 85 to the mud mix tank 60 wherein $CaCO_3$ precipitate settles out from or is otherwise separated from the NaOH solution to provide a substantially solids-free solution which may be mixed with the ash from the smelter to provide additional green liquor. Again, it is noted that the dissolved $Na_3CO_3$ in the scrubber water resulting from the introduction of excess $Na_2CO_3$ in the scrubber 85 reacts with the excess lime which is carried to mud mix tank 60 with the $CaCO_3$ solids from the causticizer. Thus, additional $CaCO_3$ precipitate and NaOH is generated by the meeting of these two excess streams. The $CaCO_3$ solids are preferably conducted to the mud storage tank 65 and thereafter forwarded to the kiln 80 to convert the $CaCO_3$ to CaO in the manner described above to provide a source of lime for use in the method.

As described above, the aqueous phase of the solution drained from the scrubber 85 is conducted from the mud washer 65 to the dissolving tank 40 via conduit 38. This provides a green liquor which contains NaOH in addition to the sodium carbonate recovered from the smelt. The green liquor is then conducted through the recovery process and, as described previously, the NaOH which is incorporated within the green liquor from the mud washer 65 is recovered along with NaOH generated in the causticizer to improve the overall recovery of sodium in the process.

Accordingly, the present invention will be understood to enable significant improvements in the recovery of sodium values from spent cooking liquor over conventional recovery processes. In addition, the process of the present invention avoids disadvantageous aspects of prior art methods and provides improved results as compared to prior art methods.

The foregoing description of various features and embodiments of the present invention has been provided for purposes of illustration only, and it is understood that numerous modifications, substitutions, and alterations may be made without departing from the spirit and scope of the invention as defined in the following claims. The embodiments described herein are the best mode known to applicant for practicing the invention, but it will be understood that other or improved modes of practicing the invention may be devised which incorporate the invention as claimed herein.

What is claimed is:

1. A method for recovering sodium from a spent cooking liquor used in a kraft pulping process employing sodium hydroxide as a cooking agent resulting in the presence of sodium and sulfur combined with various elements in the spent cooking liquor, the method comprising the steps of:

(a) concentrating the spent cooking liquor and combusting the concentrated liquor to produce a smelt containing $Na_2CO_3$, and combining the smelt with water to provide a green liquor;

(b) reacting the green liquor with $Ca(OH)_2$ in a causticizer to produce a solution of NaOH containing $CaCO_3$ as a precipitate and separating the $CaCO_3$ precipitate from the NaOH solution to provide a source of recovered NaOH for use in providing fresh cooking liquor;

(c) heating at least a portion of the separated $CaCO_3$ in a kiln to convert $CaCO_3$ to CaO, wherein CaO emerges from the kiln as a dry product and hot gases containing CaO particles entrained therein are evolved from the kiln;

(d) conducting the CaO dry product from the kiln to a slaker for reacting with the green liquor of step (a) to provide $Ca(OH)_2$ for the reaction of step (b), wherein the CaO dry product is provided to the slaker in a stoichiometric excess so that unreacted lime is present in the reaction products from the causticizer;

(e) contacting the hot gases evolved from the kiln containing CaO particles with a scrubbing solution consisting essentially of water, NaOH, and $Na_2CO_3$ with some $CaCO_3$ and CaO solids suspended therein, to produce $CaCO_3$ and NaOH from a reaction of the CaO particles with $Na_2CO_3$ wherein the $Na_2CO_3$ is present in the scrubbing solution in stoichiometric excess so that a resulting solution of $NaOH/Na_2CO_3$ contains $CaCO_3$ as a precipitate, and separating the $CaCO_3$ precipitate from the $NaOH/Na_2CO_3$ solution to provide a source of recovered NaOH for use in providing fresh cooking liquor and a source of $Na_2CO_3$ for reacting with lime to produce NaOH;

(f) recycling the $CaCO_3$ precipitate from step (e) to the kiln; and (g) conducting the excess lime and the $CaCO_3$ precipitate from the causticizer to a mixing tank and contacting the $NaOH/Na_2CO_3$ solution of step (e) to react $Na_2CO_3$ in the solution with excess lime from the causticizer, producing NaOH and $CaCO_3$.

2. The method of claim 1, wherein the scrubbing solution is present in a vessel as a pool of scrubbing solution and the presence of solids in the scrubbing solution contacted with the hot gasses in step (e) is minimized by withdrawing the scrubbing solution from a location near the upper surface of the pool prior to contacting the hot gases therewith.

3. The method of claim 1, wherein the scrubbing solution of step (e) includes up to about 35 wt. percent sodium carbonate.

4. The method of claim 1, wherein the scrubbing solution of step (e) is supplied to the hot gases for contacting CaO particles in the hot gases at a rate equivalent to from about 20 lbs. to about 40 lbs. of $Na_2$/ADT.

5. A method for recovering sodium from a spent cooking liquor used in a kraft pulping process employing sodium hydroxide as a cooking agent resulting in the presence of sodium and sulfur combined with various elements in the spent cooking liquor, the method comprising the steps of:

(a) concentrating the spent cooking liquor and combusting the concentrated liquor to produce a smelt containing $Na_2CO_3$, and combining the smelt with water to provide a green liquor;

(b) reacting the green liquor with $Ca(OH)_2$ to produce a solution of NaOH containing $CaCO_3$ as a precipitate and separating the $CaCO_3$ precipitate from the NaOH solution to provide a source of recovered NaOH for use in providing fresh cooking liquor;

(c) eating at least a portion of the separated $CaCO_3$ in a kiln to convert $CaCO_3$ to CaO, wherein CaO emerges from the kiln as a dry product and hot gases containing CaO particles entrained therein are evolved from the kiln;

(d) reacting the CaO dry product from the kiln with water to produce $Ca(OH)_2$ to provide $Ca(OH)_2$ for the reaction of step (b);

(e) scrubbing the lime kiln gases containing CaO particles in a scrubber with a scrubbing solution consisting essentially of water, NaOH, and $Na_2CO_3$ with some $CaCO_3$ and CaO solids suspended therein, to cause the CaO to react with the $Na_2CO_3$ to produce scrubber solution bottoms containing NaOH and $CaCO_3$ precipitate;

(f) conducting at least a portion of the scrubber solution bottoms from the scrubber and separating the $CaCO_3$ precipitate from the solution to provide a solution containing NaOH substantially free of $CaCO_3$ precipitate for use in providing fresh cooking liquor; and (g) recycling the $CaCO_3$ precipitate from step (f) to the kiln and recycling at least a portion of the scrubber solution bottoms into the scrubbing solution so that the scrubbing solution contains at least NaOH and $Na_2CO_3$ with some $CaCO_3$ and CaO solids suspended therein.

6. The method of claim 5, wherein the scrubbing solution is present in a vessel as a pool of scrubbing solution and the presence of solids in the scrubbing solution contacted with the hot gasses in step (e) is minimized by withdrawing the scrubbing solution from a location near the upper surface of the pool prior to contacting the gases with the scrubbing solution.

7. The method of claim 5, wherein the scrubbing solution of step (e) includes up to about 35 wt. percent sodium carbonate.

8. The method of claim 5, wherein the scrubbing solution of step (e) is supplied to the hot gases for contacting CaO particles in the hot gases at a rate equivalent to from about 20 lbs. to about 40 lbs. of $Na_2$/ADT.

* * * * *

UNITED STATES PATENT AND TRADEMARK OFFICE
CERTIFICATE OF CORRECTION

PATENT NO. : 5,597,445

DATED : January 28, 1997

INVENTOR(S) : J. Lennart Westerberg

It is certified that error appears in the above-indentified patent and that said Letters Patent is hereby corrected as shown below:

Column 7, line 18, delete "Na$_3$CO$_3$" and insert -- Na$_2$CO$_3$ --

Column 8, line 60, delete "eating" and insert -- heating --.

Signed and Sealed this

Second Day of September, 1997

Attest:

BRUCE LEHMAN

*Attesting Officer*  *Commissioner of Patents and Trademarks*